United States Patent [19]

Yokota

[11] Patent Number: 5,774,713
[45] Date of Patent: Jun. 30, 1998

[54] FILE CREATING METHOD FOR CONSTRUCTING SYSTEM ENVIRONMENT, SYSTEM ENVIRONMENT CONSTRUCTING METHOD AND COMMAND START SYSTEM

[75] Inventor: Yuko Yokota, Tokyo, Japan

[73] Assignee: Mitsubishi Denki Kabushiki Kaisha, Tokyo, Japan

[21] Appl. No.: 312,477

[22] Filed: Sep. 26, 1994

[30] Foreign Application Priority Data

Sep. 28, 1993 [JP] Japan .................................. 5-241743

[51] Int. Cl.$^6$ ................................................ G06F 17/30
[52] U.S. Cl. ..................... 395/601; 395/603; 395/604; 395/611; 395/616; 395/183.01
[58] Field of Search .................................. 395/600, 575, 395/500, 159, 129, 145, 614, 601, 603, 604, 611, 616, 183.01; 364/260

[56] References Cited

U.S. PATENT DOCUMENTS

| 5,001,628 | 3/1991 | Johnson et al. | 364/200 |
| 5,210,824 | 5/1993 | Putz et al. | 395/145 |
| 5,241,624 | 8/1993 | Torres | 395/129 |
| 5,247,666 | 9/1993 | Buckwold | 395/600 |
| 5,317,687 | 5/1994 | Torres | 395/159 |
| 5,495,595 | 2/1996 | Peters et al. | 395/500 |

FOREIGN PATENT DOCUMENTS 59-58512  4/1984  Japan .

OTHER PUBLICATIONS

Unix Magazine, Mar. 1991 "An Introduction to X Window System".

Unix Magazine, Apr. 1991 "An Introduction to X Window System".

Melcom Software Memo "User Command", date unknown.

Unix System Administration Handbook, date unknown.

Primary Examiner—Thomas G. Black
Assistant Examiner—Cheryl R. Lewis
Attorney, Agent, or Firm—Wolf, Greenfield & Sacks, P.C.

[57] ABSTRACT

A file creation method for constructing a system environment, a system environment constructing method, and a command start system. Prior to using the system, a plurality of application programs are classified into field groups, which are further divided into groups on the basis of functions thereof. The groups are further divided into input items on the basis of command options. Every layer of a hierarchy is ranked. Character strings are assigned to icons, button and data input frame so as to represent names or functions of groups. Files are created for every layer and group so that they contain information on the ranks, icons, and linkages between files. The files are read out and displayed in a top-down manner according to their ranks, so that a specific application program can be designated by selecting at least one icon or option, or entering an input item. Thereafter, the application program will be started.

21 Claims, 12 Drawing Sheets

| | | | |
|---|---|---|---|
| MENU NO. (NO 1 ONLY) | | | ~410 |
| RANK TYPE (RANK 1) | | | ~412 |
| DEFINITION LINE NUMBER | | | ~414 |
| ICON NO. | ICON TITLE | FIELD PANEL NO. | IMAGE FILE NAME OF ICON |
| ~416 | ~418 | ~420 | ~422 |

402

REPEAT FOR DEFINITION LINE NUMBER

Fig. 6

| | | | | | 408 |
|---|---|---|---|---|---|
| MENU NO. (NO 4XXYY) | | XX: ICON NO. | | YY: PROGRAM NO. | ← 456 |
| RANK TYPE (RANK 4) | | | | | ← 458 |
| PANEL ATTRIBUTE (BACKGROUND COLOR, BUTTON COLOR, TEXT FRAME COLOR) | | | | | ← 460 |
| DEFINITION LINE NUMBER | | | | | ← 462 |
| ITEM NO. | INPUT ITEM NAME | INPUT TYPE | CLASSIFIED SELECTION ITEM | OTHER ITEM (INITIAL VALUE, INCREMENT, FINAL NAME) | DEFAULT VALUE |
| ~ | ~ | ~ | ~ | ~ | ~ |
| 464 | 466 | 468 | 470 | 472 | 474 |

REPEAT FOR DEFINITION LINE NUMBER

Fig. 9

| 102 | 100 | 104 |
|---|---|---|
| INVOICE ISSUE | LOAD INVOICE ↲ RUN ↲ | |
| ADDRESS REGISTRATION | LOAD ADDRS ↲ RUN ↲ | |
| CUSTOMER MANAGEMENT | LOAD CUSTM ↲ RUN ↲ | |
| SCHEDULE OF PRESIDENT | LOAD SCHED ↲ RUN ↲ | |

FILE CREATING METHOD FOR CONSTRUCTING SYSTEM ENVIRONMENT, SYSTEM ENVIRONMENT CONSTRUCTING METHOD AND COMMAND START SYSTEM

BACKGROUND OF THE INVENTION

1. Field of the Invention

This invention relates to a system environment building method for enabling a user to construct a work environment even when he or she is unfamiliar with an operating system for the initial starting of application software programs, a file creating method for system constructing files suitable for the system environment constructing method, and a command start system applicable to the foregoing methods.

2. Description of the Related Art

FIGS. 12 to 15 of the accompanying drawings show a conventional job starting system disclosed in Japanese Patent Laid-Open Publication No. Sho 59-58512. Specifically, FIG. 12 shows the system configuration suitable for carrying out the system. FIG. 13 lists the contents of a job menu registering file. FIG. 14 is a flowchart for a job selection starting program. FIG. 15 depicts a job menu display.

Referring to FIG. 12, the system comprises a central processing unit CPU 10. A floppy disc drive (FDD) 12 as an external storage is connected to the CPU 10. The floppy disc drive 12 reads or writes data from or into a floppy disc (FD), which stores various programs and data, and a job menu registering file 100 (shown in FIG. 13). Further, the CPU 10 is connected to a main memory 14 for storing a variety of programs and data, a job menu registering program, and the job selection starting program (shown in FIG. 14). A CRT monitor 16 as a display unit and a keyboard 18 as an input unit are also connected to the CUP 10.

In the conventional system, the CPU 10 executes the job menu registering program stored in the main memory 14, thereby creating a job menu registration file 100 as shown in FIG. 13. The job menu registration file 100 comprises pairs of job menus 102 and command character strings 104. Each job menu 102 is displayed on the CRT monitor 16 when the job selection start program (to be described later) is executed. The user operates the keyboard 18 so as to select one of the job menus 102 displayed on the CRT monitor 16. Then, the command represented by the command character string 104 corresponding to the selected job menu 102 is read out of the job menu registration file 100 and is executed. In other words, each command character string 104 represents each command to be executed in response to each selected job menu 102.

The created job menu registration file 100 enables jobs to be started based thereon. The user operates the keyboard 18 in a predetermined manner so as to have the CPU 10 execute the job selection start program stored in the main memory 14. Referring to FIG. 14, the CPU 10 reads the contents of the job menu registration file 100 stored in the main memory 14 (step 200), and displays, on the CRT monitor 16, a plurality of jobs 102 constituting the job menu registration file 100 (step 202). The job menus 102 are displayed on the CRT monitor 16 as shown in FIG. 15. Observing the CRT monitor 16, the user operates the keyboard 18 to move a cursor 16 to a desired one of the job menus 102 (step 204). Thereafter, the CPU 10 executes the command represented by the command character string 104 corresponding to the selected job menu 102 (step 206). Thus, the user can selectively start his or her desired job without being concerned with the job start command.

However, in the conventional system, the job menu registration file is created in such a manner that the job menus and the command character strings correspond completely to one another. Therefore, when options or data are different from each other even in the case of one command for starting the same program, different job menus must be given. In other words, it is necessary to give all possible modified patterns of the same command with different options or data in the Job menu registration file.

Further, since only the predetermined job menus are selectable in the conventional system, it is impossible to set or select options or data for each job as desired, which means reduced usability of the system.

SUMMARY OF THE INVENTION

It is a first object of the invention to enable a user to start at least one desired application program even when he or she is unfamiliar with an initial start command provided by an operation system.

It is a second object of the invention to construct a system environment facilitating execution of components constituting the command, e.g. the selection and setting of options and data, having a high usability, and enabling the user to use the commands in a flexible manner.

It is a third object of the invention to eliminate the necessity of filing all command patterns corresponding to different options and data.

It is a fourth object of the invention to provide a system environment which is highly compatible with UNIX (trade name) and other operating systems.

It is a fifth object of the invention to relieve the user of creating initial start files.

It is a sixth object of the invention to enable the user to perform various jobs by using a work station even when he or she is unfamiliar with computers or the like.

It is a seventh object of the invention to enable the concurrent and parallel execution of a plurality of application programs.

It is an eighth object of the invention to allow an effective use of an X display management (XDM) function provided as a standard function in UNIX.

In accordance with a first aspect of the invention, there is provided a file creation method for constructing a system environment. The method comprises: a) a first step for creating first files for the hierarchic management of a plurality of application programs while ranking the first files depending upon a functional hierarchy of the plurality of application programs; b) a second step for creating second files on the hierarchic management of the application programs while ranking them depending upon set-up hierarchies of the plurality of application software programs; and c) a third step for storing the first and second files.

In the invention, a hierarchical file structure comprises a plurality of first and second files, respectively. The first files correspond to hierarchical functional groups of a plurality of application programs while the second files correspond to hierarchical setting of a plurality of application programs. The created first and second files are stored, and are used to actually construct a system environment. In such a case, it is possible to trace the hierarchical functional structure of a plurality of application programs on the basis of the contents of the first files, thereby facilitating the selection of at least one application program to be started. The second files are used to trace the hierarchical setting structure of the application programs, so that it is easy to input conditions for starting the application programs. In these operations, the user is not required to have a good knowledge of the initial start commands related the operation system.

The first files are created as follows. The application programs are classified into a plurality of hierarchical functional groups from the viewpoint of functions thereof. This step is repeated for every layer. The plurality of hierarchical functional groups are ranked depending upon their layers. At least one character representing either names or functions of at least one of a plurality of hierarchical functional groups which are in a lower layer and are linked with every one of hierarchical function groups in a higher layer is assigned to at least one predetermined selectable image. Thus, the created first files include information on the ranks and linkage with respect to the plurality of hierarchical functional groups after the ranking and assigning steps.

The second files will be created in the following manner. Commands for either starting or running the plurality of application programs are divided into a plurality of components according to a command form or command forms so as to produce a plurality of hierarchical setting groups. This division is executed for every layer. The plurality of hierarchical setting groups are ranked depending upon their layers. At least one character representing either names or functions of at least one of the plurality of hierarchical setting groups which are in a lower layer and linked with every one of hierarchical setting groups in a higher layer is assigned to the predetermined selectable images. Thus, the second files include information on the ranks and linkage with respect to the plurality of hierarchical setting groups after the ranking and assigning steps.

Hence, the first files are used to assign the character strings representing the names or the functions of the application programs to the predetermined selectable images (e.g. icons). The second files are for assigning the components (e.g. program names, options, or data) of the commands for starting the application programs to the predetermined selectable images or data input areas (e.g. input frames).

Specifically, when creating first files, a plurality of application programs to be started by a given operating system are classified into a plurality of groups (e.g. sets of application programs having similar functions). Further, the application programs are hierarchically classified, on the basis of their functions, into large, intermediate and small groups. Character strings representing names or functions of the classified application programs are assigned to the predetermined selectable images so that even a user unfamiliar with the operating system can operate the system. Each first file is created for every layer of the hierarchy in a top-down manner.

Further, when creating the second file, the commands for starting the application programs are divided into components in accordance with the command formats determined by the operating system. It is assumed that the popular UNIX program is used as the operation system. An initial start command thereof has a form as represented by formula (1). The command form is divided into components such as a program name, a selective option, a value setting option, and standard input data. The second files are for assigning characters representing names or functions of the components, i.e. information the user can understand, to the predetermined selectable images or data input areas. Further, the second files are created for every layer in the hierarchy in a top-down manner.

$$\text{Program name}-a-v\text{value}<\text{standard input data} \qquad (1)$$

where
   a: selective option, and
   −v value: value setting option

The first files include information on the linkages with respect to layers so that the hierarchy can be traced from the upper layers to the lower layers in sequence. Further, the second files include information concerning the linkages between groups and components so as to trace components from the upper layers to the lower layers in sequence. Further, the first and second files are ranked so as to permit the hierarchial display thereof.

According to the file creation method for constructing a system environment of the invention, the names or functions of a plurality of application programs mounted on the system are replaced with predetermined selectable images such as icons. When the contents of the first files are displayed, the user selects one of the selectable images so as to start his or her desired application program. Further, the initial start command format expressed by formula (1) can be divided into significant components and replaced, for every component, with the selectable images such as icons or data input areas such as data input frames. Therefore, when the contents of the second files are displayed, the user can input a desired option or data by selecting one of the selectable images or data input areas. The foregoing operations can be performed by the user even when he or she does not have any knowledge of the start command on the operating system.

When classifying the application programs during the creation of the first files, it is preferable to classify the application programs, which are concurrently operable, into different groups, and to classify application programs, which are not concurrently operable, into the same groups. Therefore, a plurality of the application programs can be concurrently executed without any problem preventing the concurrent execution of programs.

To apply the present invention to UNIX, it is preferable to understand the program names, selective options, value setting options and standard input data as the components. This will lead to more effective use of the XDM function.

It is preferable that the predetermined selectable images are icons or buttons, and that the data input areas are input frames.

According to a second aspect of the invention, a system environment construction method comprises: a) a first step for displaying information representing at least one of a first or second file linked with a first file of the highest rank in a hierarchy constituted by a plurality of first and second files, the information being displayed by at least one predetermined selectable image or data input area contained in the first file of the highest rank; b) a second step for displaying, following user's operation of at least one predetermined selectable image or data input area after the first step, information representing at least one of a first or second file of which linkage is shown by said predetermined selectable image or data input area, and which is in a lower layer in the hierarchy than said at least one or second file in the first step; c) a third step for repeatedly executing the second step for every layer in the hierarchy in a top-down manner; and d) a fourth step for determining at least one application program to be started and setting starting conditions thereof in accordance with the operated predetermined selectable image or images or data input area or areas at the end of the third step, and for starting at least one selected application program under the set starting conditions.

In this aspect, the first files are created for each of a plurality of application programs which are different in fields and functions and are hierarchically classified. The first files are ranked in accordance with the layers they belong to and include at least one predetermined selectable image representing linkages thereof with at least one other first file in lower layers. The second files are created for each of the plurality of application programs which are different in fields, functions and start command forms, and are hierarchically classified. The second files are ranked in accordance with the layers they belong to and include at least one predetermined selectable image or data input area representing linkages thereof with at least one other first or second file in lower layers.

The system environment constructing method is carried out by using the first and second files which are created according to the foregoing file creation method of the invention.

In operation, a first file which has the highest rank is read first of all out of the first files created according to this method. Then, predetermined selectable images are displayed on a display together with characters representing names or functions of contents in the first read file. Observing the display, the user operates one of the displayed selectable images, thereby specifying a desired group. A first file which is linked with the specified group and is in a lower layer will be read and displayed. The foregoing operation is repeated for every layer, so that at least one application program loaded in the system will be selected. The application programs will be indicated by characters representing their names or functions, so that the user is not required to have a good knowledge of initial start commands for the operating system.

The selection of the application program enables reading of a second file which is created according to the method, has a highest rank, and is linked with the selected application program. The contents of the second file are displayed by predetermined selectable images or data input areas contained therein together with characters representing names or functions of command components for starting the selected application program. The user operates one of the selectable images or enters data in the data input area according to the command components. In response thereto, a second file, which is linked with the foregoing second file and is in a lower layer, is read, and the contents of the second will be displayed. The foregoing operation is repeatedly executed for a plurality of second files which are hierarchically linked according to ranks thereof. When the components for the selected application program are entirely selected or input, the selected application programs will be started accordingly. In this stage, the user is not required to be familiar with the initial start commands for the operating system.

Thus, the user can start the application program without considering the operating system. Since the components of the initial start commands are input in accordance with the command forms, it is not necessary to file all the command patterns with different options and data. Therefore, the user can use the commands in a flexible manner so as to select a job menu compared with when selecting the predetermined menu in the conventional system. Further, the second files are created in accordance with the command forms, so that the system is compatible with any operating system as well as UNIX.

In a fourth aspect of the invention, a command start system comprises: memory means for storing application programs, and first and second files; display means for displaying a plurality of predetermined selectable images such as icons or buttons, or at least one data input area such as an input frame; input means for enabling the selection of said predetermined selectable image or entry of data in said data input area when either the selectable image or data input area is shown on the display means; and processing means loaded with a given operating system including start commands for application programs. The first and second files are stored simultaneously with the production of the command start system. The first files are created for a plurality of groups of application programs which are different in fields and functions and are hierarchically classified. The first files are ranked on the basis of a layer thereof and include at least one predetermined selectable image representing a linkage with at least one first file in a different layer. The second files are created for a plurality of groups of application programs which are different in fields, functions and start command forms and are hierarchically classified. Each of the second files is ranked on the basis of a layer thereof and includes at least one predetermined selectable image or data input area representing a linkage with at least one first or second file in a different layer. The processing means performs the following. In response to the activation of the command start system, it allows the display means to show a screen for entering user identification data. On the basis of information entered via the input means, it allows the display means to show the predetermined selectable image or data input area so as to indicate information representing at least one first or second file linked with a first file which has the highest rank in a hierarchy constituted by first and second files, and includes the predetermined selectable images or data input areas. In response to the selection of the predetermined selectable image or data entering in the data input area, it allows the display means to show other information representing at least one first or second file in a lower layer by means of at least one predetermined selectable image or data input area contained therein. Either the first or second file in the lower layer is linked with the first file in the higher layer in the hierarchy. The processing means repeatedly executes the foregoing operations for every first or second file in every layer of the hierarchy, and sets conditions to start at least one application program, thereby starting the desired application program under the set start conditions.

With the command start system of the invention, the first and second files which are created according to the system environment constructing system of the invention are stored in a storage area when the system is prepared. Upon the activation of the system, the screen is displayed so as to enable the user to enter his or her identification data. The system environment constructing system will be executed when necessary information is entered via an input device. Therefore, the user is not required to create either first or second files, which can make the system more usable and versatile. Further, the user can easily and efficiently perform the initial start operation even when he or she does not have a good knowledge of computers.

BRIEF DESCRIPTION OF THE DRAWINGS

FIG. 6 schematically shows the configuration of a functional icon definition file;

FIG. 9 schematically shows the configuration of a standard input menu definition file;

DETAILED DESCRIPTION OF THE PREFERRED EMBODIMENT

The invention will be described with reference to a preferred embodiment shown in the accompanying drawings.

Figures 12, 13:
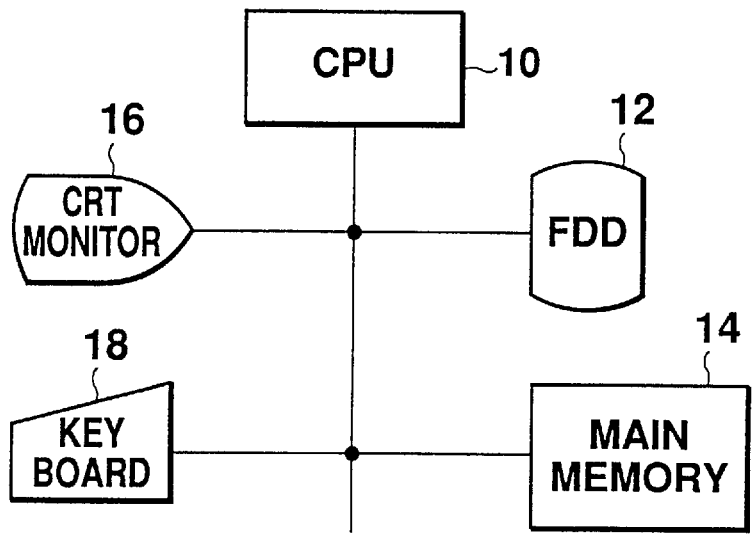
FIG. 12 is a block diagram of a system loaded with a plurality of application software programs.
FIG. 13 schematically shows a job menu registration file in a conventional job start system.
Figure 14:
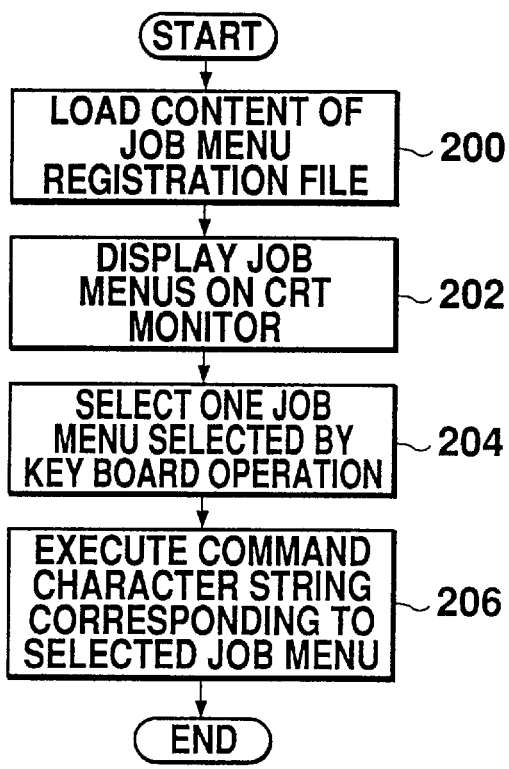
FIG. 14 is a flowchart showing a job selection start program in the conventional system shown in FIG. 13.
Figure 15:
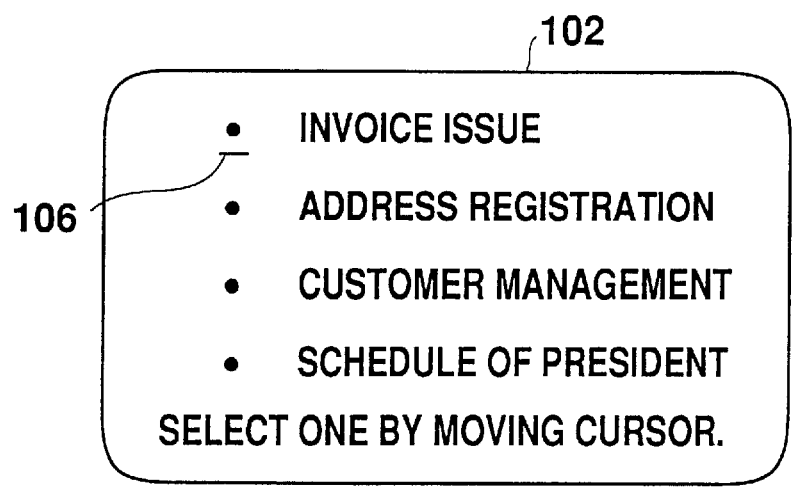
FIG. 15 schematically shows a job menu display in the conventional system.

The present invention is applicable to a system having the configuration as shown in FIG. 12. Therefore, it is assumed that the present invention is executed in the system of FIG. 12. Needless to say, the present invention is not limited to this system, e.g. with respect to details of the system configuration, or use of a floppy disk drive (FDD) as an external memory. It is preferable to use a mouse as a selecting device.

(1) Screen configurations

FIGS. 1 to 4 show patterns of the rank 1 to rank 4 screens used in the embodiment. The rank 1 screen (in FIG. 1) comprises a plurality of field panels, each of which has a plurality of functional icons. The rank 2 screen of FIG. 2 comprises a functional panel. The rank 3 screen of FIG. 3 comprises an option panel. The rank 4 screen of FIG. 4 comprises a standard input menu panel. The ranks 1 and 2 are concerned with the selection of application software programs (load modules) while the rank 3 relates to setting of command options, and the rank 4 relates to inputting of data according to the command forms.

a) Rank 1 screen

Figure 1:
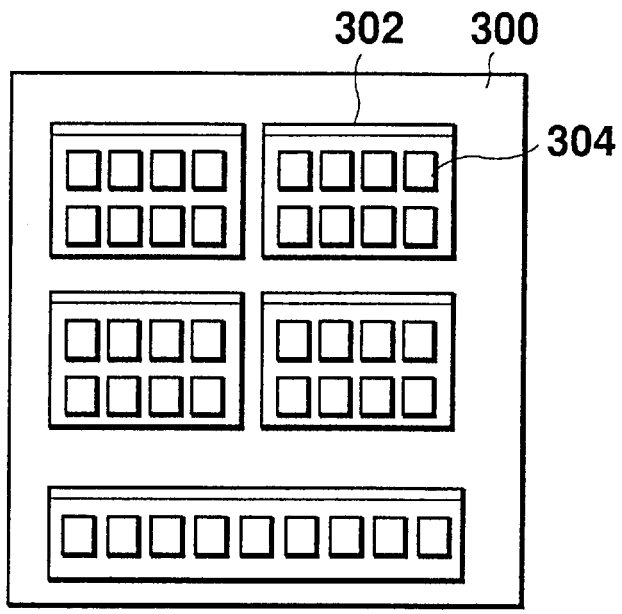
FIG. 1 is a schematic diagram showing a rank 1 screen in one embodiment of the invention.

As will be described later, when the system is activated, a user ID (identification) input screen will be displayed first of all. The user inputs his or her ID, so that the rank 1 screen will be displayed as shown in FIG. 1. The rank 1 screen comprises a plurality of field panels 302 as well as a background 300.

A color or pattern of the background 300 can be determined on the basis of bit-mapped data or the like, and is usually designed by a system designer as desired. The field panels 302 are arranged on the rank 1 screen in correspondence with large groups $S_i$ (i=1, 2, ...) of the application programs loaded in the system. The application programs are classified into large groups $S_i$ in accordance with their fields. Each field panel 302 displays characters or the like to represent an application program contained therein.

Generally, a plurality of field panels 302 are displayed on the rank 1 screen. Hence, the user observes the displayed field panels 302, thereby knowing an outline of the fields of the application programs in the system. Out of the plurality of application programs of the system, those which are concurrently operable are classified into different large groups $S_i$, and are placed on different field panels 302. This is effective when a plurality of application programs are executed concurrently and in parallel as will be described later.

Each large group $S_i$ is functionally classified into intermediate groups. Each field panel 302 generally includes a plurality of functional icons 304 corresponding to the intermediate groups. Each functional icon 304 has a character or a character string so that the user can efficiently know functions $S_{ij}$ (i=1, 2, ...; j=1, 2, ...) of the corresponding intermediate group. While the rank 1 screen is being displayed, the user clicks one of the functional icons 304 with the mouse or the like so as to select one of the functions $S_{ij}$. As described above, when the concurrently operable application programs are classified into different large groups $S_i$ and are made to belong to different field panels 302, and when a plurality of functional icons 304 can be simultaneously clicked, a plurality of application programs can be concurrently executed in parallel. In this case, buttons or the like can be used in place of the functional icons.

b) Rank 2 screen

Figure 2:
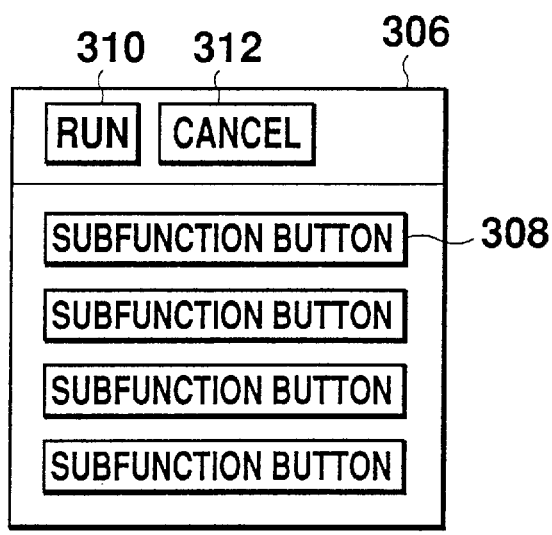
FIG. 2 is a schematic diagram showing a rank 2 screen in the embodiment.

When one of the functional icons 304 is clicked, the rank 2 screen will be displayed as shown in FIG. 2 except for the case in which only one subfunction is provided for the functional panel 306 corresponding to the clicked functional icon 304. The rank 2 screen comprises the functional panel 306, which generally includes a plurality of subfunction buttons 308. The functional panel 306 is displayed by clicking one of the functional icons 304, and represents the function $S_{ij}$ associated with the clicked functional icon 304. The subfunction buttons 308 correspond to the subfunctions which are sub-divisions of the function $S_{ij}$. In the embodiment, these subfunctions correspond to the application programs (load modules) $S_{ijk}$ (i=1, 2, ...; j=1, 2, ...; and k+1, 2, ...).

By clicking one of the subfunction buttons 308 displayed on the rank 2 screen, the user selects one of the application programs $S_{ijk}$ in the system. The user clicks a run button RUN 310 with the mouse or the like so as to execute the selected application program $S_{ijk}$. The user clicks a cancel button (CANCEL) 312 so as to cancel the selection. The subfunction buttons 308 are displayed together with character strings or the like to represent such subfunctions similarly to the foregoing functional icons 304, so as to assist the user.

c) Rank 3 screen

Figure 3:
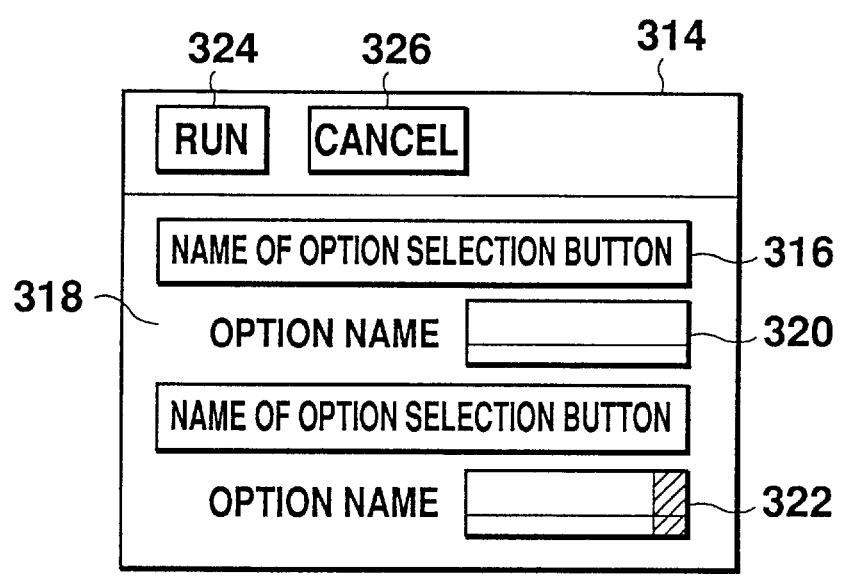
FIG. 3 is a schematic diagram showing a rank 3 screen in the embodiment.
Figure 4:
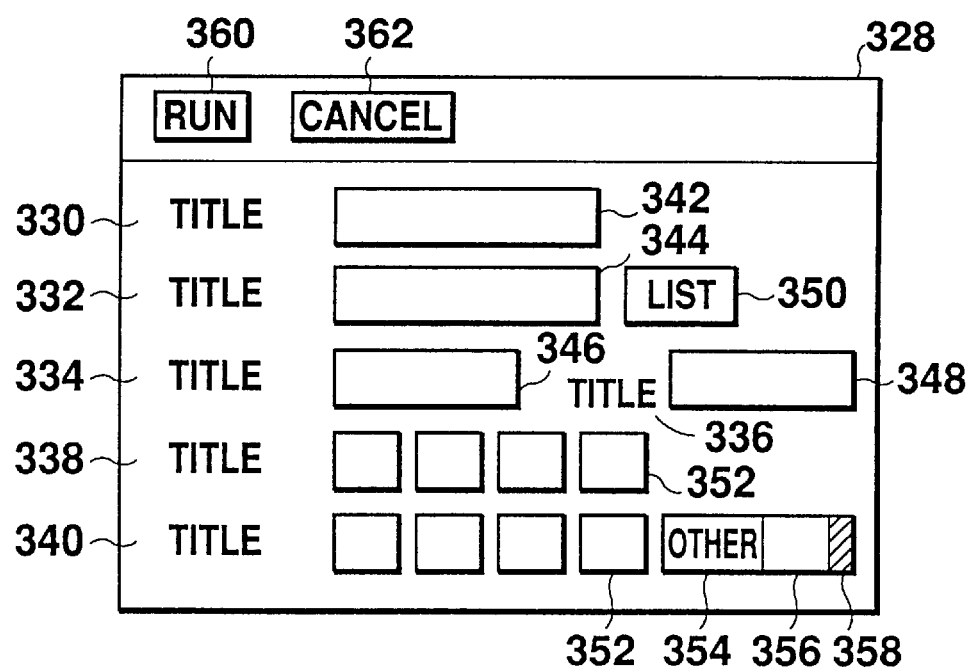
FIG. 4 is a schematic diagram showing a rank 4 screen in the embodiment.

After the selection of the application program $S_{ijk}$, i.e. after clicking one of subfunction buttons 308 and the run button 310, the rank 3 screen will be displayed as shown in FIG. 3 when an option setting operation is required. Conversely, when a standard input is necessary instead of the option setting operation, the rank 4 screen will be displayed as shown in FIG. 4. Further, when neither the standard input nor the option setting operation is necessary, the selected application program $S_{ijk}$ will be executed.

The rank 3 screen comprises an optional panel 314, which generally includes a plurality of selective option buttons 316, title of value setting option texts 318, and value setting option input frames 320. The selective option buttons 316 correspond to the selective options in the UNIX commands expressed by the formula (1). These buttons 316 are titled so as to explicitly represent the meaning of the options. The value setting option texts 318 and the value setting option input frames 320 are the texts and input frames, respectively, for inputting the value setting options of the UNIX commands expressed by the formula (1). The value setting option texts 318 have titles explicitly representing the meanings of the value setting options. The value setting option input frames 320 are used so as to input the option values. A cursor 322 is operated to input the option values in the value setting option input frames 320. Therefore, it is possible to design the value setting option input frames 320 in such a manner that the characters overflowing from the input frames 320 are kept or that the input contents can be re-confirmed. After selecting the selective options and inputting the value setting options on the displayed option panel 314, the user clicks a run button 324 to set the selective option and value setting option of the command for starting the application programs $S_{ijk}$ selected on the rank 1 screen and the rank 2 screen. To correct or change the set option, a cancel button 326 is clicked first, and the selection or input operation will be performed again.

d) Rank 4 screen

The rank 4 screen will be displayed as shown in FIG. 4 after the option is selected or is input. The rank 4 screen comprises a standard input menu panel 328, which will be displayed when either an interactive input or a standard data input is required to start the application program $S_{ijk}$. Otherwise, the application program $S_{ijk}$ will be executed without displaying the rank 4 screen.

In the embodiment, five kinds of input forms are available for the standard data input, and are displayed in a display window, i.e. a standard input menu panel 328.

A first form sets one item of a character string. For this purpose, the standard input menu panel 328 includes a standard input data text 330 and a text input frame 342. The standard input data text 330 suitably indicates a character string representing the type of standard input data to be input. The user can input data in the text input frame 342.

A second form includes a list data selecting function as well as the function of the first form. In other words, in the second form, the standard input menu panel 328 includes not only the standard input data text 330, the text input frame 342, an input data text 332, and a text input frame 344 but also a list button 350. The input data text 332 and the text input frame 344 are similar to the input data text 330 and the text input frame 342 in the first form, respectively. The operation of the list button 350 enables data selected from a predetermined list to be displayed in the text input frame 344.

A third form includes two or more standard data texts 334 and 346, and two or more text input frames 346 and 348. In other words, the third form can set a plurality of text items. The standard input data texts and text input frames are alternately arranged in the third form.

A fourth form permits the selection of an input character string from a plurality of patterns, and includes a title 338 and a plurality of selection pattern buttons 352. By selectively clicking the selection pattern buttons 352, a necessary character string will be input as the standard input data.

A fifth form includes a further title 354 and a further text input frame 356 as well as the contents of the fourth form. In the fifth form, a typical pattern out of a plurality of selectable patterns is indicated as a character string on the selection pattern buttons 352. The other items are displayed one after another in the other text input frame 356 by operating a cursor 358. The character string "OTHER" is displayed on an "other" title button 354.

The user selects one of the foregoing input forms on the displayed rank 4 screen. In accordance with the selected input form, the user inputs the standard input data by means of the input frames 342 to 348, list button 350, selection pattern buttons 352, cursor 358 and other means. Following the operation of the run button 360, the application program $S_{ijk}$ selected on the rank 1 and 2 screens will be started in accordance with the option selected or set on the rank 3 screen and the standard input data inputted on the rank 4 screen. The cancel button 362 is clicked so as to re-input the standard input data.

(2) Creation of a screen definition file

Prior to displaying the rank 1 to rank 4 screens and executing the command start according to these screens, it is necessary to make the functional elements of the rank 1 to 4 screens correspond to the application programs $S_{ijk}$ or respective components (e.g. the options, data, etc.) of the start commands. A screen definition file 400 defines the foregoing correspondence, and is preferably created at the time of system construction.

Figure 5:
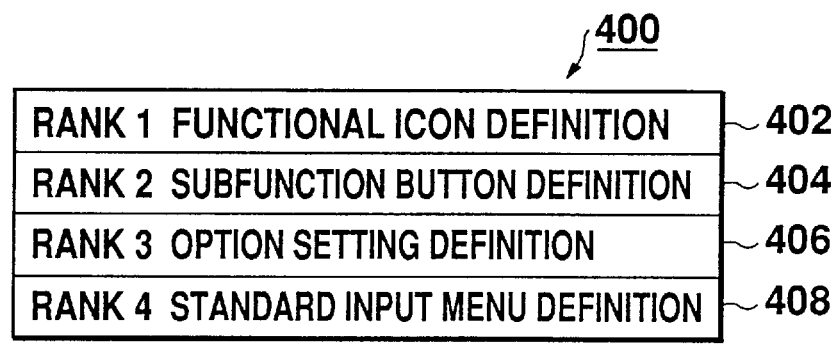
FIG. 5 is a schematic diagram showing the configuration of a screen definition file required prior to display the rank 1 to the rank 4 screens.

Referring to FIG. 5, there is shown the configuration of the screen definition file 400, which includes four definition parts for the ranks 1 to 4 corresponding to the four screens. The four definition parts are divided into a functional icon definition part 402 for the rank 1 screen, subfunction button definition parts 404 for the rank 2 screen, option set screen definition parts 406 for the rank 3 screen, and standard input menu definition parts 408 for the rank 4 screen. For brevity, one set of the parts 404 to 408 is depicted in FIG. 5. Each of the definition parts 400 to 408 constitutes one file, the contents of which are represented by characters.

a) Functional icon definition part

FIG. 6 shows the configuration of the functional icon definition part 402. The functional icon definition part 402 includes three lines. A first line has a character string "NO 1" as a menu number 410; a second line has a character string "RANK 1" indicating the rank 1 as the rank type; and a third line has a definition line number 414. The icon numbers 416, icon titles 481, field panel numbers 420 and icon storage file names 422 are described according to the number of lines defined in the definition line number 414.

The icon numbers 416 are serial numbers assigned to the functional icons 304 constituting the rank 1 screen. The icon titles 418, field panel numbers 420 and icon pattern storage file names 422 correspond to the functional icons 304. The icon numbers 416 specify the functional icons 304. The icon titles 418 are character strings which are displayed below the functional icons 304 so as to indicate the title of the functional icons 304. The field panel numbers 420 are assigned, as a serial number like 1, 2, . . . , to the field panels 302 containing the functional icons 302. The icon pattern storage file names 422 are character strings representing the names of files storing image patterns (e.g. bit maps or the like) as the functional icons 304.

Thus, the functional icon definition part 402 defines the field panels 302 constituting the rank 1 screen, and the configuration and displaying format of the functional icons 304. The icon numbers 416, icon titles 418, field panel numbers 420 and icon pattern storage file name 422 may be separated by a character such as ",".

b) Subfunction button definition parts

Figure 7:
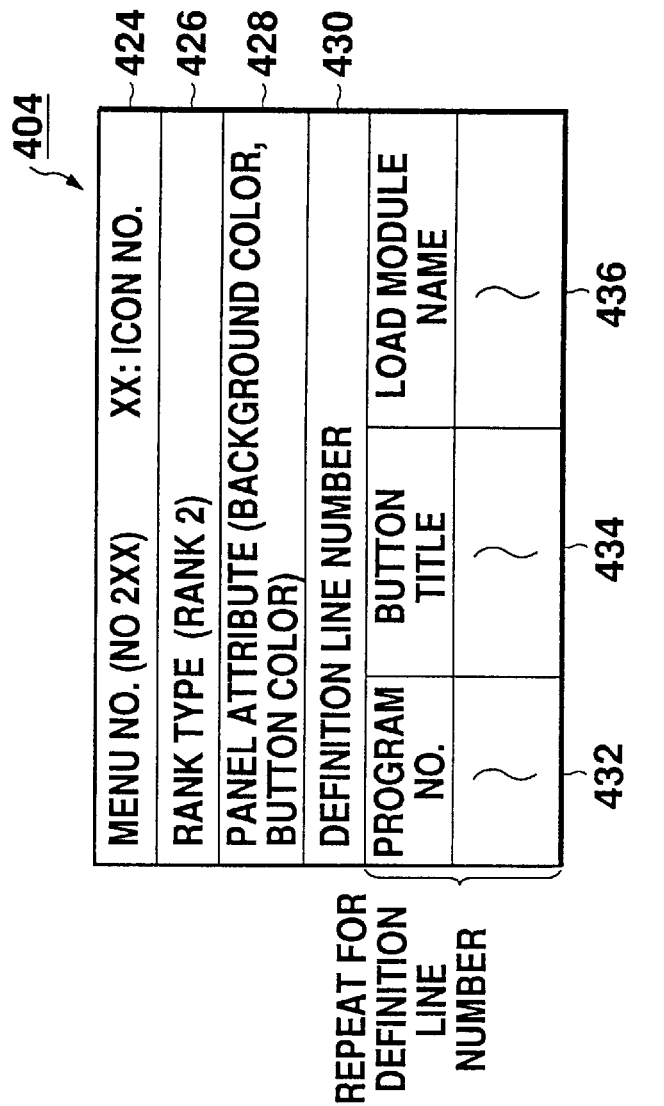
FIG. 7 schematically shows the configuration of a subfunction button definition file.

One subfunction button definition part 404 is provided for each functional icon 304 defined in the functional icon definition part 402. Therefore, a plurality of subfunction button definition parts 402 are present in the system. Referring to FIG. 7, each of the subfunction button definition parts 404 includes a menu number 424, a rank type 426, a panel attribute 428, a definition line number 430, program numbers 432, button titles 434, and load module names 436.

The menu number 424 is described by a character string "NOU2XX", where "2" denotes the rank 2, and "XX" denotes the icon number. The "XX" in the menu number 424 is the same as the icon number 416 of the corresponding function icon 304. A character string "RANKU2" denotes the rank type 426, i.e. the rank 2. The panel attribute 428 comprises character strings defining a background color and button colors. The definition line number 430 comprises character strings denoting the number of lines in the program numbers 432, button titles 434 and load module names 436, thereby denoting the number of the subfunction buttons 308 on the corresponding functional panel 306.

The program numbers 432 include character strings denoting the serial numbers of the corresponding subfunction buttons 308, i.e. the serial numbers of the application programs $S_{ijk}$. The button titles 434 include character strings representing the titles shown on the subfunction buttons 308. The load module names 436 include character strings representing the module names of the application programs $S_{ijk}$ in the system. Each of program numbers 432, button title 434 and load module name 436 are separated by the character "," . Referring to FIG. 7, the functional panel 306 constituting the rank 2 screen is defined by the subfunction button definition part 404.

c) Option set screen definition part

Figure 8:
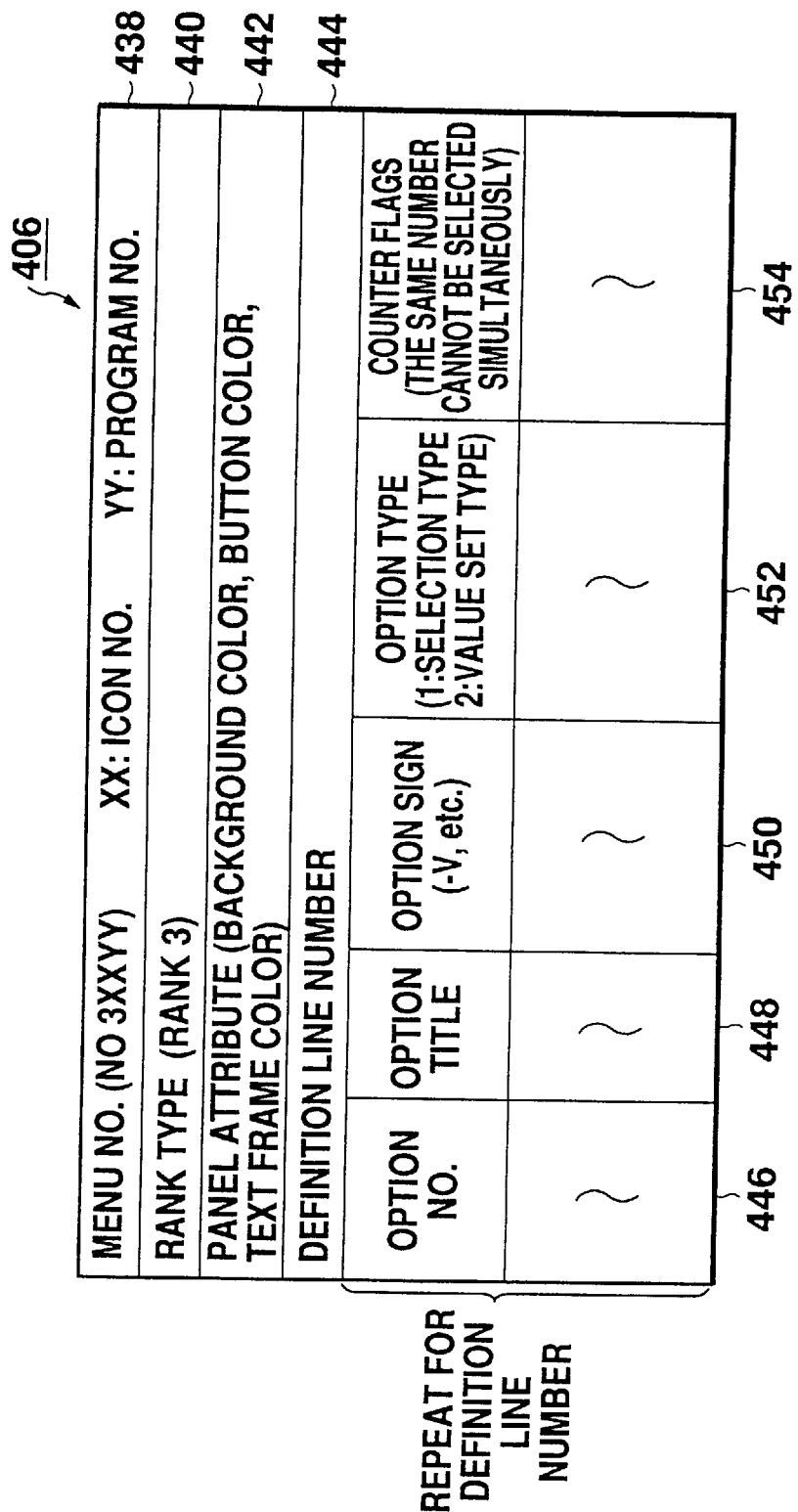
FIG. 8 schematically shows the configuration of an option setting screen definition file.

Referring to FIG. 8, the option set screen definition part 406 comprises a menu number 438, a rank type 440, a panel attribute 442, a definition line number 444, option numbers 446, option titles 448, option signs 450, option types 452, and counter flags 454.

The menu number 438 comprises a character string "NOU3XXYY", where 3 denotes the rank 3, "XX" denotes the corresponding icon number in the same manner as the subfunction button definition part 404, and "YY" denotes the corresponding subfunction button number 308, i.e. the program number 432. In other words, a plurality of the option set screen definition parts 406 are present depending upon the number of the selective option titles 316 and the value setting option input frames 320 on the rank 3 screen. No subfunction button definition part 404 is created for the application programs $S_{ijk}$ without options. In the rank type 440, a character string "RANKU3" indicates the rank 3. In the panel attribute 442, character strings represent a background color, button colors and text frame colors of the option panel 314 on the rank 3 screen. In the definition line number 444, character strings represent the number of the options on the option panel 314. The option numbers 446, option titles 448, option types 452 and counter flags 454, which will be described later, are repeatedly described in the number of lines as shown in the definition line number 444.

The option numbers 446 comprise character strings representing the serial numbers assigned to the options of the corresponding option panel 314. The option titles 448 comprise character strings corresponding to the titles displayed for the selective option buttons 316 or the value setting option texts 318 of the corresponding options. The option sign 450 is represented by the characters such as "-v" or the like. In the option type 452, the character "1" represents the selective option, while "2" represents the value set option, for example. In the counter flag 454, the options which are not simultaneously selectable or of which values are not simultaneously determined are classified into groups, and represented by characters 0, 1, . . . . In this case, the character 0 represents an independent option which can be simultaneously set with any other options. The characters representing the option groups are separated by the character "," or the like.

d) Standard input menu definition part

The standard input menu definition part 408 is configured as shown in FIG. 9, and comprises a menu number 456, a rank type 458, a panel attribute 460, a definition line number 462, item numbers 464, input item names 466, input types 468, selective items 470, other items 472, and default values 474.

The menu number 456 has the same configuration similarly to the menu number 438 of the option set screen definition part 406. In the menu number "NO4UXXYY", "4" represents the rank 4. In the panel attribute 460, character strings represent a background color, panel colors text frame colors on the corresponding standard input menu panel 328. The definition line number 462 indicates the number of lines of the item numbers 464, i.e. the number of input items on the standard input menu panel 328. No standard input menu definition part 408 will be prepared for the application programs $S_{ijk}$ which do not require standard input data.

Each of the item numbers 464 includes a character string representing a serial number of each input item on the corresponding standard input menu panel 328. The input item names 466 are character strings representing titles assigned to the input items, i.e. the titles displayed on the standard input data texts 330 to 340. The input types 468 are numerical representations (1 to 5) of the first to fifth forms of the standard inputs. The selective items 470 are character strings such as in the form of "item 1", "item 2", . . . item n", to be displayed on the selection pattern buttons 352 for the second title form. In other cases, the characters "" are used. The other items 472 indicate numerical values or character strings to be displayed in the other text input frame 356 in accordance with the operation of the cursor 358. The numerical values in the other item 472 denote "an initial value, increment, and final value". The character strings in the other item 472 are given in the form of "another item 1, another item 2, . . . another item n". The default values 474 denote data which have been entered beforehand. The character strings in the default value 474 are displayed in the space therefor of the standard input menu panel 328 or is displayed on the buttons in the predetermined manner. However, in the fifth form, it is impossible to select the default value in the other items 472.

(3) System operation and user's operation during actual use

The screen definition file 400 shown in FIGS. 5 to 9 is created when constructing a system, for example. When the system having such a screen definition file 400 is used, it will operate in the sequence as shown in FIG. 10, while the user's operation will be as shown in FIG. 11.

When the system is activated (step 500), a CPU 10 interprets and executes an XDM function (X display management) which is written in files /etc/rc as a standard function in UNIX. Then, the CPU 10 displays a user ID input window on the CRT monitor 16 (step 502). Thereafter, the user enters a user ID and a password by operating the keyboard 18 (step 600). In this embodiment, the user ID "shutdown" is present in a UNIX password file. When the user enters this user ID, the system will be de-activated (step 504). Usually, the user does not enter such a user ID but enters his or her own ID along with the password.

Figure 10:
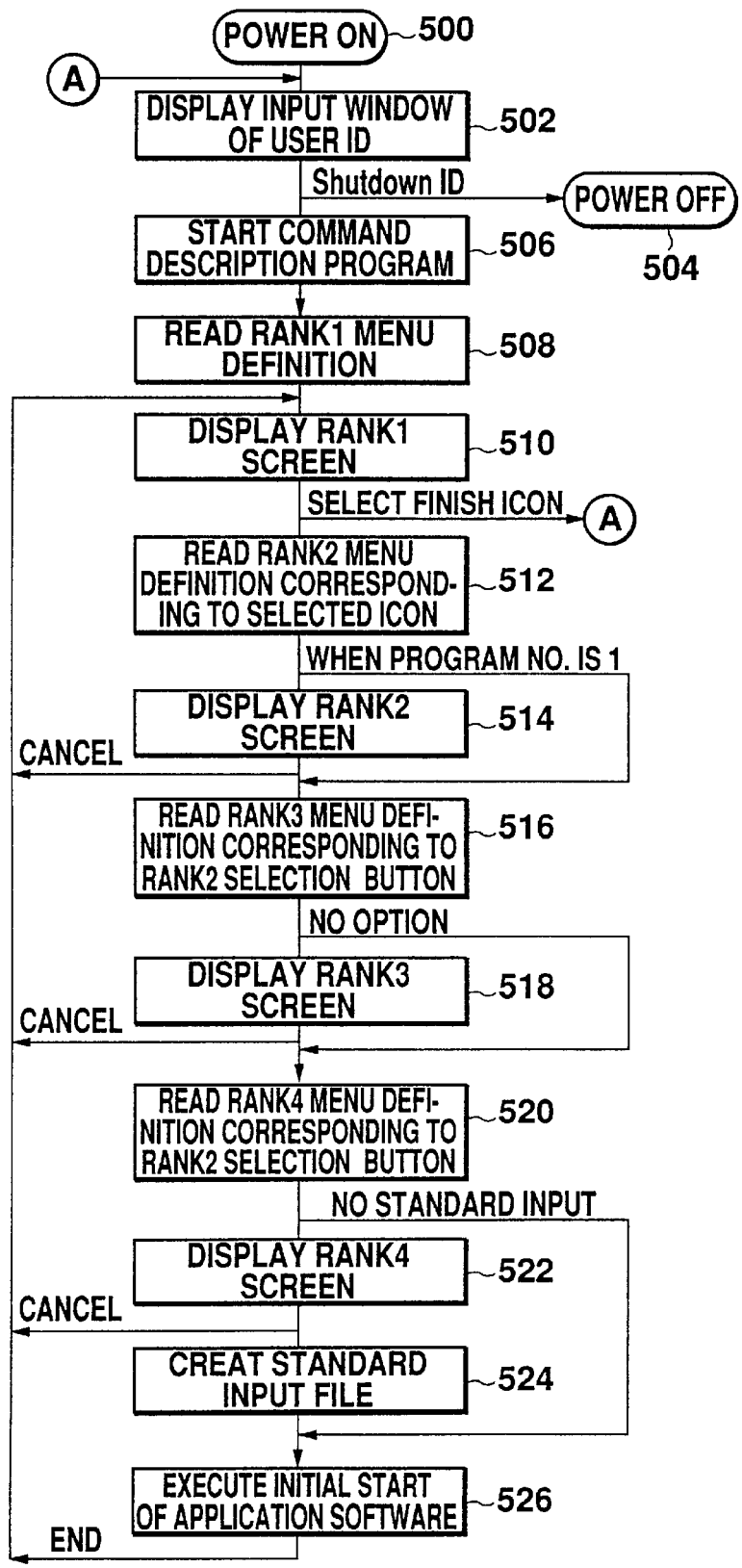
FIG. 10 is a flowchart of an operation of a CPU and the like, in connection with a user's operation, according to the embodiment.
Figure 11:
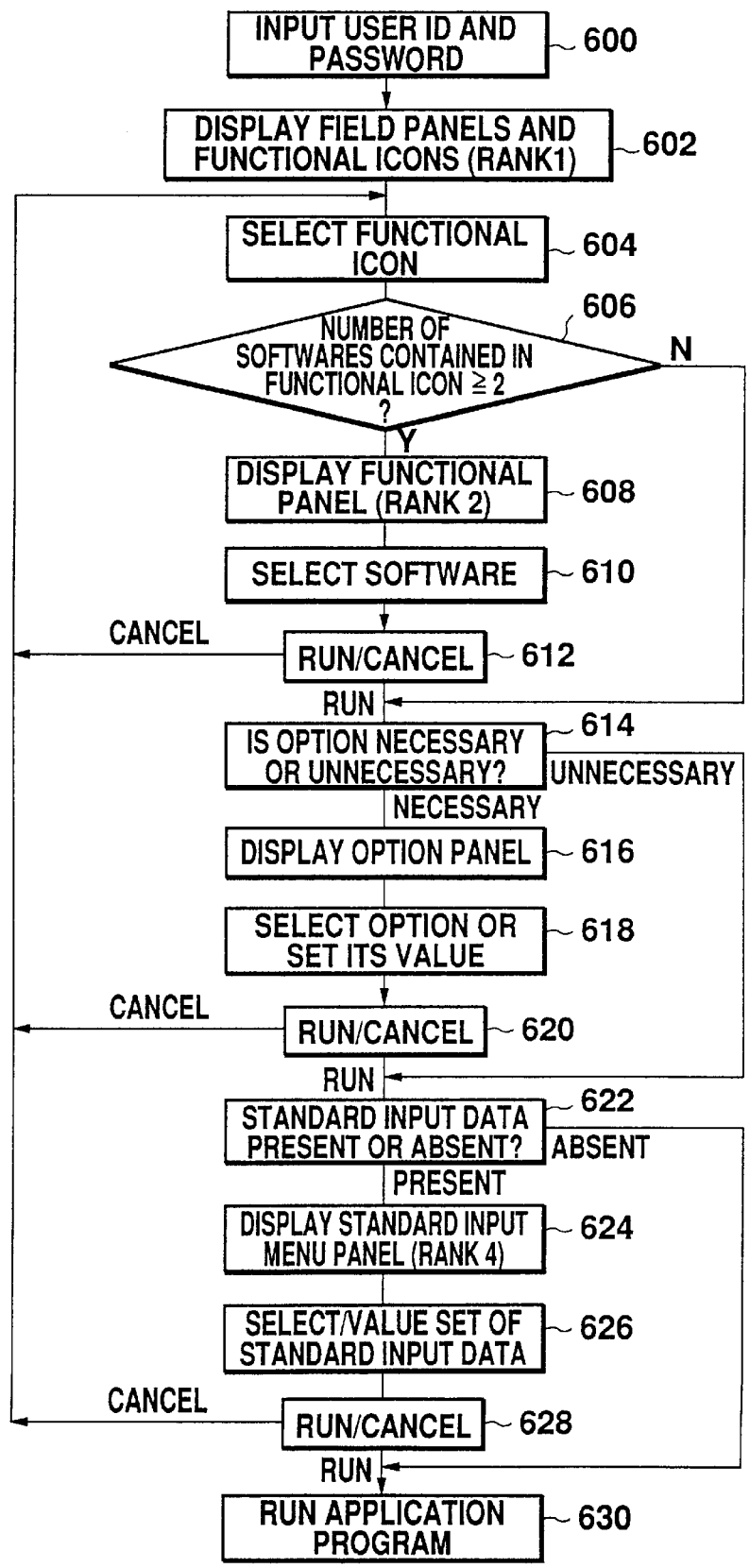
FIG. 11 is a flowchart of the user's intervention in the embodiment.

In this embodiment, a command description program, which is used for the steps following step 506 shown in FIG. 10, has been entered in an XDM start definition file contained in the whole system on the main memory 14, the route directory "/", or the home directory of each user ID. Therefore, when the user enters his or her ID and password in step 600, the command description program will be started accordingly (step 506).

Following the start of the command description program in step 506, the CPU 10 reads the functional icon definition part 402 defining the rank 1 screen menu from the screen definition file 400 into the main memory 14 (step 508), thereby displaying the rank 1 screen on the CRT monitor 16 (step 510) as shown in FIG. 1. Observing the displayed field panel 302 and functional icons 304 (step 602), the user clicks one of the functional icons 304 so as to start the function $S_{ij}$ (step 604). Then, the CPU 10 reads into the main memory 14 the subfunction button definition part 404 defining the rank 2 screen corresponding to the selected icon 304 (step 512). In this state, when a finish icon to finish the execution of the command description program is selected, control logic returns to the step 502, where the user ID window will be displayed. This finish icon is for killing a child process of the XDM when UNIX is used. Further, when the function $S_{ij}$ related to the functional icon 304 selected in step 604 does not have a plurality of application programs $S_{ijk}$ (steps 512 and 606), the subsequent rank 2 screen and so on will not be displayed.

The CPU 10 displays the rank 2 screen (as shown in FIG. 2) on the CRT monitor 16 (step 514) in accordance with the subfunction button definition part 404 read into the main memory 14 in step 512. Observing the rank 2 screen (step 608), the user clicks one of the subfunction buttons 308 so as to select one of the application programs $S_{ijk}$ (step 610). Further, the user clicks either the run button 310 or the cancel button 312 on the rank 2 screen (step 612). When the run button 310 is clicked, the control logic advances to the operation associated with the selected application program $S_{ijk}$. Conversely, the clicking of the cancel button 312 returns the control logic related to the operation of the CPU 10 to step 510, and returns the control logic related to the user's operation to step 604 (steps 514 and 612).

In response to the clicking of the run button 310 in steps 514 and 612, the CPU 10 reads into the main memory 14 the option set screen definition part 406 with respect to the selected application program $S_{ijk}$ (step 516). However, when no option is necessary to start the application program $S_{ijk}$, the rank 3 screen will be skipped after steps 516 and 614. In step 518, the CPU 10 displays the rank 3 screen (as shown in FIG. 3) on the CRT monitor 16 on the basis of the contents of the option set screen definition part 406 read into the main memory 14. Observing the displayed rank 3 screen (step 616), the user selects an option or executes the value setting operation (step 618). When the user clicks the cancel button 326 (step 620), the operation of the CPU 10 returns to step 510, while the user's operation returns to step 604. Conversely, when the run button 324 is clicked in step 620, the CPU 10 advances to the operation in step 520 while the user's operation proceeds to step 622.

Thereafter, the CPU 10 reads into the main memory 14 the standard input menu definition part 408 for the rank 4 screen corresponding to the application program $S_{ijk}$ selected in step 610, thereby displaying the rank 4 screen (shown in FIG. 4) on the CRT monitor 16 (step 522). However, when the standard input data is found to be absent after reading the standard input menu definition part 408, the CPU 10 proceeds to the operation in step 526 from step 520, while the user's operation proceeds to step 630 from step 622. When the standard input data is found to be present in steps 520 and 622, the rank 4 screen is displayed on the CRT monitor 16. Looking at the rank 4 screen (step 624), the user performs the selection or value setting of the standard input data (step 626), and then clicks either the run button 360 or the cancel button 362 (step 628). Following the clicking of the cancel button 362, the CPU 10 returns to the operation in step 510 while the user's operation returns to step 604. On the other hand, when the run button 360 is clicked, the CPU 10 proceeds with the operation in step 524 while the user's operation is completed. In response to the selection or value setting in step 626, the CPU 10 creates a standard input file on the basis of the entered standard input data (step 524), and starts the corresponding application program $S_{ijk}$ on the basis of the created standard input file (steps 526 and 630). After executing the application program $S_{ijk}$, the CPU 10 returns to the operation in step 510 while the user can restart the operation from step 604.

(4) Advantageous results of the invention

According to the invention, the application programs $S_{ijk}$ are hierarchically classified into the large, intermediate and large groups by using the field panels 302, functional icons 304 and subfunction buttons 308. Thus, the selection of the functional icons 304 and subfunction buttons 308 enables the user to start the application programs even when he or she is unfamiliar with the initial start commands for the operating system OS. Further, since it is possible to select, set and enter the selective option or value setting option for the initial start commands on either the rank 3 or 4 screen, the user can freely select contents of the options and standard input data as desired, compared with the conventional system having a fixed menu. Further, when the contents of the options and the standard input data are different, a system with high usability can be obtained without registering the patterns on the job menu registration file. Further, the screen definition file 400 is created at the time of building the system, and the programs shown in FIG. 10 are started when the system is activated and the user enters his or her ID or the like. This enables the user to build the system environment as desired by a simple operation such as entering the ID or the like, which makes the system very usable. The foregoing function can be realized by using the XDM function incorporated in UNIX as a standard function. Further, the filing is performed in accordance with the command forms, the present invention is applicable to operation systems other than UNIX and has an extensive versatility.

What is claimed is:

1. A method for constructing a system environment relating to a user interface, the method comprising the steps of:
    creating first files for hierarchically managing a plurality of application programs, the first files being ranked in accordance with a functional hierarchy of the plurality of application programs;
    creating second files for hierarchically managing the plurality of application programs, the second files being ranked in accordance with a set-up option hierarchy of the plurality of application programs; and
    storing the first and second files.

2. The method as in claim 1, wherein the step of creating first files includes the steps of:
    classifying the plurality of application programs into a plurality of hierarchical functional groups based upon functions performed by the plurality of application programs, said classifying step being repeated for every layer of the functional hierarchy;
    ranking the plurality of hierarchical functional groups according to their layer;
    assigning to a predetermined selectable image representing a hierarchical functional group at least one character representing one of name or function of at least one of a plurality of hierarchical functional groups which are in a lower layer and are linked with the hierarchical functional group in a higher layer; and
    storing information on the ranks and linkage of the plurality of hierarchical functional groups in the first files.

3. The method as in claim 2, wherein the step of creating second files includes the steps of:

dividing commands for one of starting or running the plurality of application programs into a plurality of components according to a command form to produce a plurality of hierarchical setting groups, said dividing step being executed for every layer of the set-up option hierarchy;

ranking the plurality of hierarchical setting groups according to their layer;

assigning to one of a second predetermined selectable image or a predetermined data input area representing a hierarchical setting group at least one character representing one of name or function of at least one of the plurality of hierarchical setting groups which are in a lower layer and are linked with the hierarchical setting group in a higher layer; and storing information on the ranks and linkage of the plurality of hierarchical setting groups in the second files.

4. The method as in claim 3, wherein the plurality of hierarchical setting groups constitute lower hierarchical groups to the plurality of hierarchical functional groups.

5. The method as in claim 3, wherein said components of the command form include a program name, a selective option, a value setting option and standard input data.

6. The method as in claim 3, wherein predetermined selectable images are at least one icon or button, and said predetermined data input area is a frame for entering at least one of characters or numbers.

7. The method as in claim 2, wherein said predetermined selectable image is at least one icon or button.

8. The method as in claim 1, wherein the step of creating second files includes the steps of:

dividing commands for one of starting or running the plurality of application programs into a plurality of components according to a command form to produce a plurality of hierarchical setting groups, said dividing step being executed for every layer of the set-up option hierarchy;

ranking the plurality of hierarchical setting groups according to their layer;

assigning to one of a predetermined selectable image or a predetermined data input area representing a hierarchical setting group at least one character representing one of name or function of at least one of the plurality of hierarchical setting groups which are in a lower layer and are linked with the hierarchical setting group in a higher layer; and storing information on the ranks and linkage of the plurality of hierarchical setting groups in the second files.

9. The method as in claim 8, wherein said components of the command form include a program name, a selective option, a value setting option and standard input data.

10. The method as in claim 8, wherein said predetermined selectable image is at least one icon or button, and said predetermined data input area is a frame for entering at least one of characters or numbers.

11. The method as in claim 1 further comprising the steps of:

classifying the plurality of application programs into a plurality of field groups prior to the steps of creating the first files and creating the second files; and creating first and second files for every field group.

12. The method as in claim 11, wherein application programs which are concurrently operable are classified into different field groups and application programs which are not concurrently operable are classified into a single field group.

13. A system environment constructing method relating to a user interface, the method comprising the steps of:

displaying information linked with a first file of a first type having a highest rank in a hierarchy constituted by a plurality of files representing at least one second file of said first type or a second type, said information being represented by at least one of a selectable image or a data input area, said first file of the highest rank including links to said at least one second file and said at least one of the selectable image or data input area;

displaying, following a user's input with respect to said displayed selectable image or data input area, information representing at least one third file of said first type or said second type corresponding to said selectable image or data input area which is in a lower layer in the hierarchy than said at least one second file;

repeatedly executing said step of displaying information representing the at least one third file for layers in the hierarchy in a top-down manner;

determining at least one application program to be started and starting conditions thereof in accordance with the user's input with respect to the displayed selectable images and data input areas; and starting said at least one determined application program in accordance with the starting conditions;

wherein said files of the first type are created for each of a plurality of application programs that differ in field and function and are hierarchically classified, and said files of the first type are ranked according to the hierarchical layer to which they belong and include at least one selectable image representing linkages thereof with another file of the first type or the second type in a lower layer; and wherein said files of the second type are created for each of a plurality of application programs that differ in field, function and start command form, and are hierarchically classified, and said files of the second type are ranked according to the hierarchical layer to which they belong and include at least one selectable image or data input area representing linkages thereof with another file of the second type in lower layers.

14. A command start system relating to a user interface, the command start system comprising:

memory means for storing application programs and first and second types of files, said first and second types of files being stored simultaneously with the production of the command start system, said first types being created for a plurality of groups of application programs that differ in field and function and are hierarchically classified, each said first type being ranked on the basis of a layer thereof and including at least one selectable image representing a linkage with at least one first type of file in a different layer, and said second types of files being created for a plurality of groups of application programs that differ in field, function and start command form and are hierarchically classified, each said second type being ranked on the basis of a layer thereof and including at least one of a selectable image or a data input area representing a linkage with at least one of a first type of file or a second type of file in a different layer;

display means for displaying a plurality of selectable images including at least one of icons, buttons, or a data input area such as an input frame;

input means for enabling user input with respect to said selectable image when the selectable image is shown on said display means; and operating system processing means for processing information, the operating system processing means, in response to activation of said command start system, allowing said display means to display a screen for entering user identification information;

responsive to the user identification information entered via said input means, allowing said display means to show said selectable image to indicate information representing at least one first file of the first or second type that is linked with a file of the first type having a highest rank in a hierarchy constituted by the files of the first and second types and includes said selectable image;

responsive to user input with respect to the selectable image, allowing said display means to show other information representing at least one second file of the first or second type that is in a lower layer by showing at least one selectable image, said second file of the first or second type in the lower layer being linked with said first file of the first or second type in the higher layer in the hierarchy;

repeatedly executing the foregoing operations for every file of the first or second type in each layer of the hierarchy; and setting conditions to start at least one application program and starting the at least one application program according to those conditions.

15. A computer comprising:

a central processing unit;

a display device coupled to the central processing unit;

memory coupled to the central processing unit, the memory having a first portion and a second portion;

a plurality of application programs stored in the first portion of the memory; and a plurality of files stored in the second portion of the memory, the plurality of files being hierarchically ranked and including a plurality of files of a first file type and a plurality of files of a second file type, wherein the plurality of files of the first file type are hierarchically ranked according to a functional hierarchical classification of the plurality of application programs, and wherein the plurality of files of the second file type are hierarchically ranked according to a set-up option hierarchical classification of the plurality of application programs.

16. The computer of claim 15, wherein the plurality of files of the first file type includes first information that allows a particular application program of the plurality of application programs to be selected, and wherein the plurality of files of the second file type include second information that allows at least one of set-up options or data input to be selected and applied to the particular application program prior to running the particular application program.

17. The computer of claim 16, wherein the first information allows selection of the particular application program based upon a hierarchical display of at least one of name and function of the plurality of application programs.

18. The computer of claim 17, wherein the second information allows selection and application of the at least one of set-up options or data input based upon a hierarchical display by one of name or function of at least one of set-up options for the particular application program or data input areas for the particular application program.

19. The computer of claim 15, wherein the plurality of files are grouped into field groups according to a functional field of each of the plurality of application programs, and wherein application programs that are concurrently executable are grouped into different field groups and application programs that are not concurrently executable are grouped into a single field group.

20. The computer of claim 15, wherein each respective file of the first file type includes information linking a selectable image to the respective file of the first file type, the selectable image representing a linkage to at least one corresponding file of the plurality of files, the corresponding file being one of the first file type or the second file type.

21. The computer of claim 20, wherein each respective file of the second file type includes information linking a selectable image to the respective file of the second file type, the selectable image representing a linkage to at least one of set up options or input data of a particular one of the plurality of application programs.

* * * * *